United States Patent
Ito et al.

(10) Patent No.: US 6,583,913 B2
(45) Date of Patent: Jun. 24, 2003

(54) MULTIBEAM SCANNER

(75) Inventors: Koji Ito, Motosu-gun (JP); Ryota Kato, Nagoya (JP); Yutaka Hattori, Kuwana (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 09/756,871

(22) Filed: Jan. 10, 2001

(65) Prior Publication Data

US 2001/0009471 A1 Jul. 26, 2001

(30) Foreign Application Priority Data

Jan. 14, 2000 (JP) .......................................... 2000-010088

(51) Int. Cl.$^7$ .............................................. G02B 26/08
(52) U.S. Cl. ...................... 359/204; 359/216; 359/900; 347/243; 250/236
(58) Field of Search ........................ 359/204, 216–219, 359/900; 347/233–235, 243; 250/234–236

(56) References Cited

U.S. PATENT DOCUMENTS 5,821,978 A * 10/1998 Yamamoto et al. ......... 347/235

* cited by examiner

*Primary Examiner*—James Phan
(74) *Attorney, Agent, or Firm*—Oliff & Berridge, PLC (57) ABSTRACT

A multibeam scanner for scanning an image area with a plurality of laser beams, comprising a plurality of beam emitting points that emit a plurality of laser beams reaching the image area with respective time lags therebetween, a time lag determination unit that determines at least one of the time lags during a predetermined calculation time, a scan controller that controls the plurality of beam emitting points to emit the plurality of laser beams successively in the image area with the at least one of the time lags determined by the time lag determination unit. The multibeam scanner of the invention, comprises a photodetector that detects any one of the laser beams at a predetermined beam detection position. The time lag determination unit determines the time lag between the nth laser beam and the n+1th laser beam. Therefore, to scan the image area, the photodetector detects the first laser beam at the predetermined beam detection position, prior to the image area, and determines a scan start time for the first laser beam. Then, the scan controller starts controlling the first beam emitting point at the determined scan start time to emit the first laser beam in the image area. The scan controller further controls the n+1th beam emitting point to emit the nth laser beam in the image area with the calculated time lag between the nth laser beam and the n+1th laser beam.

24 Claims, 9 Drawing Sheets

MULTIBEAM SCANNER

BACKGROUND OF THE INVENTION

1. Field of Invention

The invention relates to a multibeam scanner that scans a photosensitive medium with a plurality of laser beams, thereby exposing an image on the photosensitive medium.

2. Description of Related Art

A laser beam scanner (a single beam scanner) deflects a laser beam by a deflector, such as a polygon mirror, to a photosensitive medium and forms an image with scanning lines on the photosensitive medium. (Herein, the operation of forming one scanning line is referred to as "scanning operation".)

Conventionally, the laser beam scanner comprises a beam detector that detects the laser beam at a beam detection position, before exposing the image based on image data, and outputs a detection signal (called a BD signal). Specifically, the beam detector receives the laser beam from a photodiode, converts the received laser beam to an output voltage, and amplifies the voltage by an amplifier. The beam detector detects the laser beams and outputs the BD signal, only if the amplified voltage is larger than a reference level. After a predetermined time period has elapsed since the beam detector outputs the BD signal, the laser beam scanner determines that a scan start time sets in, and starts to modulate the laser beam based on the image data. As a result, the laser beam scanner can always start the scanning operation from a predetermined scan start position.

One particular multibeam scanner comprises a plurality of laser diodes for emitting a plurality of laser beams and forms an image by using the plurality of laser beams. This multibeam scanner also comprises a beam detector for detecting each of the laser beams and outputting a BD signal for each laser beam, and therefore sets a scan start time for each laser beam.

Figure 9:
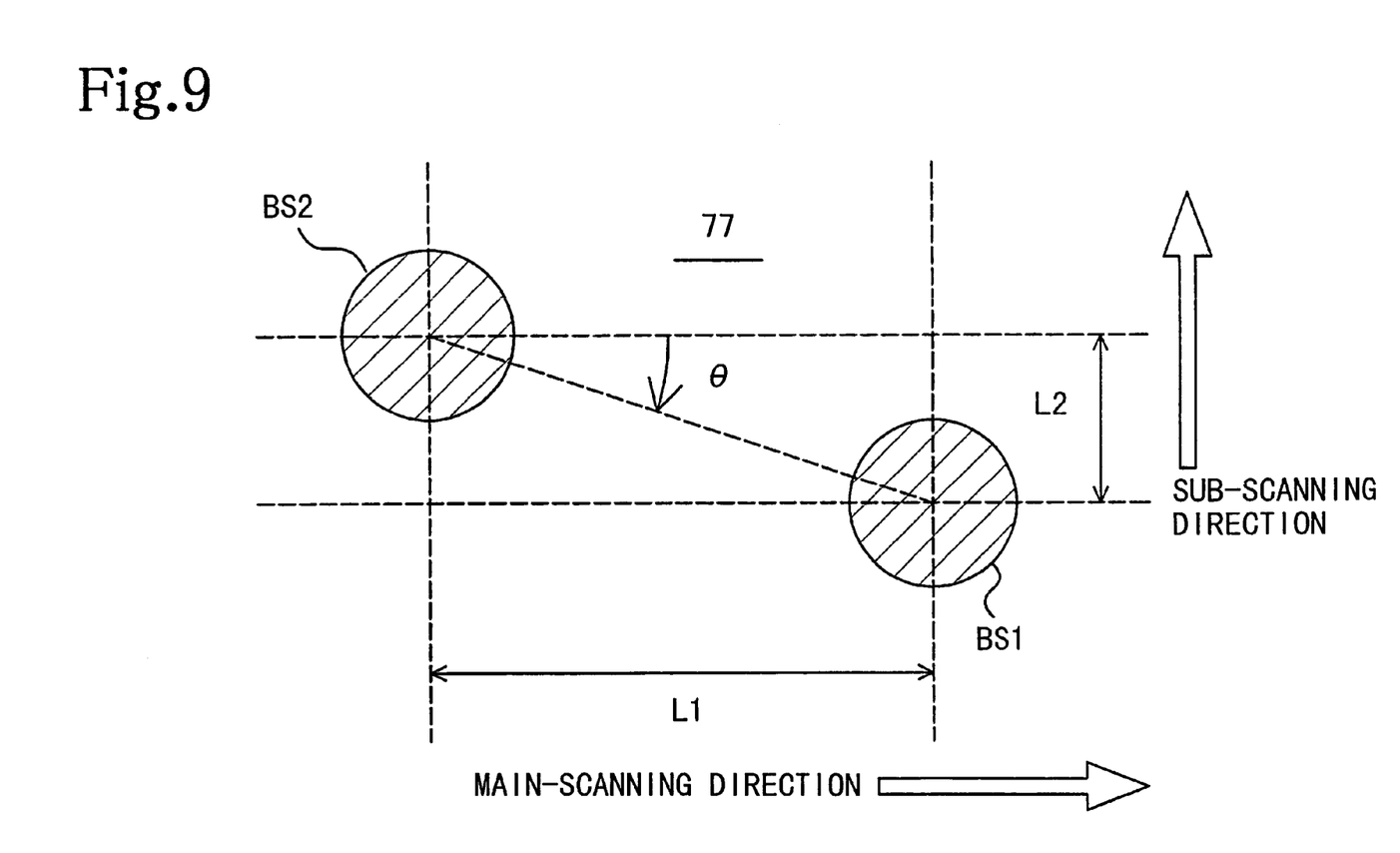
FIG. 9 schematically shows how laser beams LB1, LB2 form laser spots BS1, BS2 on a photosensitive medium in a multibeam scanner.

FIG. 9 shows how the multibeam scanner, having two laser diodes LD1, LD2, forms beam spots BS1, BS2 on a photosensitive drum 77 with laser beams LB1, LB2, respectively. Under optic constraints, the laser diodes LD1, LD2 are arranged with a certain space therebetween. As shown in FIG. 9, this space is distance L1 along a main-scanning direction. Thus, there is a time lag between the laser beams LB1 and LB2 until reaching a certain position along the main-scanning direction. The distance L1 corresponds to the time lag between the laser beams LB1 and LB2 until reaching the certain position along the main-scanning direction. In other words, there is the time lag between the scan start times of the laser beams LB1 and LB2. A distance L2 along a sub-scanning direction corresponds to a distance in resolution. The photodiode, used in the beam detector, requires some operating time before outputting the BD signal. It is thus difficult to successively output the BD signals against both of the laser beams LB1, LB2 that scans with a very short time lag therebetween.

In order to overcome such a drawback, the conventional multibeam scanner stores, in a memory, the time lag corresponding to the distance L1. This time lag has previously been determined and input in the memory during manufacturing. The multibeam scanner detects only the laser beam LB1, so that the beam detector outputs the BD signal for the laser beam LB1. Then, the multibeam scanner determines the scan start time of the laser beam LB2 after the time lag from the scan start time of the laser beam LB1.

However, there are always some errors in the dimensions of the polygon mirror, and the placement of laser diodes in every multibeam scanner that uses a polygon mirror and laser diode. Accordingly, the time lag between scan start times of the laser beams varies with multibeam scanners. The time lag thus has to be determined and stored in the memory on each multibeam scanner during manufacturing. Also, it is time and labor consuming to adjust the time lag for every multibeam scanner.

In addition, the multibeam scanner is not always placed at a constant ambient temperature. The operating temperature (especially, the inner temperature) of the multibeam scanner rises under service conditions, for example, due to heat generated by heat-producing components, such as driving motors and a heater, and heat from laser beam emission. The change in such environmental temperatures may alter the properties of the polygon mirror surfaces (such as a shape and a reflectivity), and thermal expansion or shrinkage in various lenses of the optical system. Even if the time lag is adjusted in the above-explained manner, the temperature change may cause the time lag stored in the memory to deviate from the actual time lag between the scan start times of the laser beams.

For the above reasons, it is impossible for the conventional multibeam scanner to define the scan start time for each laser beam with high precision, and therefore, impossible to provide excellent print quality.

SUMMARY OF THE INVENTION

In various exemplary embodiments, the invention provides a multibeam scanner of good print quality by correcting a time lag between scan start times of laser beams.

In various exemplary aspects of a multibeam scanner for scanning an image area, the multibeam scanner comprises a plurality of beam emitting points arranged with predetermined spaces, the plurality of beam emitting points emitting a plurality of laser beams reaching the image area with respective time lags corresponding to the predetermined spaces; a time lag determination unit that determines at least one of the time lags based on the predetermined spaces; and a scan controller that controls the plurality of beam emitting points successively to start emitting the laser beams in the image area at respective scan start times, the scan start times having the determined at least one of the time lags therebetween.

According to the invention, the multibeam scanner further comprises a photodetector that detects any one of the laser beams at a predetermined beam detection position. The plurality of beam emitting points are controlled to not emit the laser beams between the photodetector and the image area. To scan the image area, the photodetector detects a first laser beam first reaching the image area at the predetermined beam detection position, prior to the image area, and determines the scan start time of the first laser beam. Then, the scan controller starts controlling the first beam emitting point at the determined scan start time to emit the first laser beam in the image area. The scan controller further controls the nth beam emitting point to emit the nth laser beam in the image area with the calculated time lag between scan start times of the n−1th laser beam and the nth laser beam.

Particularly, the multibeam scanner of the invention comprises a deflector that comprises a plurality of deflection surfaces for deflecting the laser beams to the photodetector and to the image area, and rotates in a predetermined direction. The time lag determination unit controls the plurality of beam emitting points to emit the laser beams successively during a predetermined determination time. The photodetector detects each of the laser beams deflected by one deflection surface after the deflector rotates a predetermined number of turns. The time lag determination unit determines the time lag based on the times of detecting the laser beams during the predetermined determination time.

According to another exemplary aspect of the invention, there is provided a method for scanning an image area, the method comprising the steps of emitting a plurality of laser beams that reach the image area with respective time lags therebetween; determining at least one of the time lags; and controlling the plurality of laser beams to start emitting in the image area with the determined at least one of the time lags therebetween.

The multibeam scanner of the invention can start scanning the image area with the plurality of laser beams from the same scan start position by correcting any variations between the scan start times of the laser beam. As a result, the multibeam scanner can provide images with no loss of image quality, as described above.

BRIEF DESCRIPTION OF THE DRAWINGS

The above features and advantages of the invention will become more apparent from the following description of exemplary embodiments taken in connection with the accompanying drawings in which.

DETAILED DESCRIPTION OF EXEMPLARY EMBODIMENTS

An explanation will be given of a multibeam scanner in accordance with the invention based on the following exemplary embodiments. Herein, the exemplary embodiments refer to a multibeam scanner 12 provided in a laser printer 100.

Figure 1:
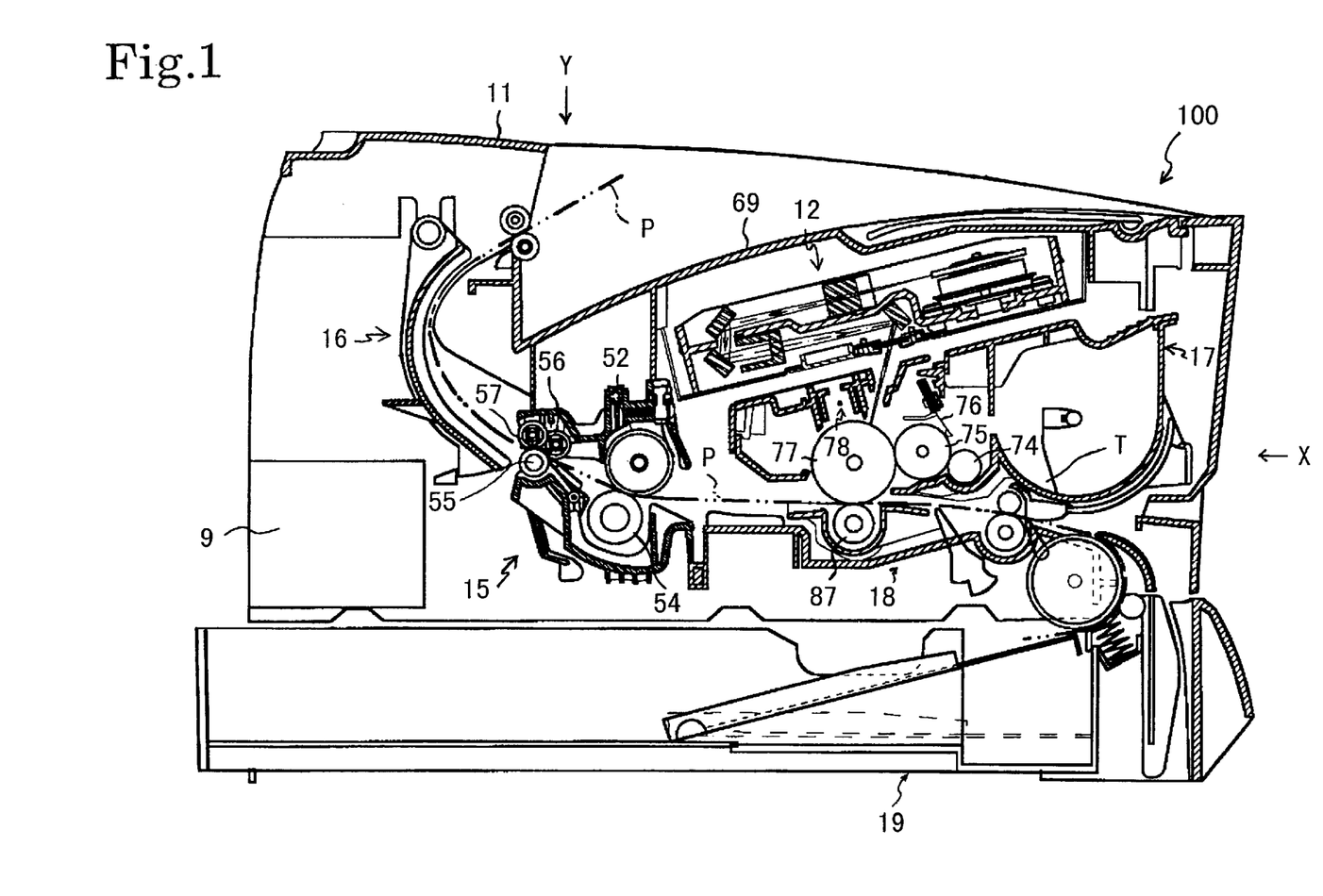
FIG. 1 is a cross-sectional view of a laser printer according to an exemplary embodiment of the invention, when viewed in a direction perpendicular to a sheet transport direction.

Firstly, the overall structure of the laser printer 100 will be described while referring to FIG. 1. FIG. 1 is a cross-sectional view of the laser printer 100 when viewed in a direction perpendicular to a sheet transporting direction. The front surface and the top surface of the laser printer 100 can be seen in directions indicated by arrows X and Y, respectively.

The laser printer 100 comprises a body frame 11, a feed unit 19 including a sheet cassette (not shown in figures) in a lower part of the body frame 11, a transport unit 18, a developing unit 17 including the photosensitive drum 77, a transfer roller 87, a fixing unit 15, a discharge unit 16, a sheet stack portion 69 and the laser scanner 12 of the invention, positioned above the developing unit 17. By the body frame 11, the overall shape of the laser printer 100 is formed in a generally parallelepiped shape.

The feed unit 19 holds sheets P in the sheet cassette and feeds the sheet P to the transport unit 18. The transport unit 18 transports the sheet P from the feed unit 19 to an image transfer position located between the photosensitive drum 77 and the transfer roller 87. The developing unit 17 has the photosensitive drum 77, a developing roller 75, a supply roller 74, a blade 76 and a charger 78, and holds therein toner T. Whereupon the charger 78 charges the photosensitive medium 77 uniformly, the laser scanner 12 scans the charged photosensitive drum 77 with two laser beams based on image data, thereby forming a latent image on the photosensitive drum 77. The supply roller 74 supplies the toner T to the developing toner T, while the blade 76 scrapes excessive toner T off from the developing roller 75 and adjusts the amount of the toner T on the developing roller 75 appropriately. The latent image is developed with the toner T, thereby forming a visible image. The transfer roller 87 transfers the visible image from the photosensitive drum 77 to the sheet P, by sandwiching the sheet P therebetween, at the image transfer position. The transport unit 18 further transports the sheet P with the transferred image to the fixing unit 15. The fixing unit 15 sandwiches the sheet P between a heat roller 52 and a press roller 54, and heats and pressurizes the sheet P, so that the toner T is melted and penetrated into fibers of the sheet P. By this, the image is fixed on the sheet P. The discharge unit 16 comprises a discharge roller 55 and subsidiary rollers 56 and 57 that are driven in synchronism with the discharge roller 55. The discharge unit 16 discharges the sheet P out of the fixing unit 15, by using the discharge roller 55 and the subsidiary rollers 56 and 57, into the sheet stack portion 69.

Figure 2:
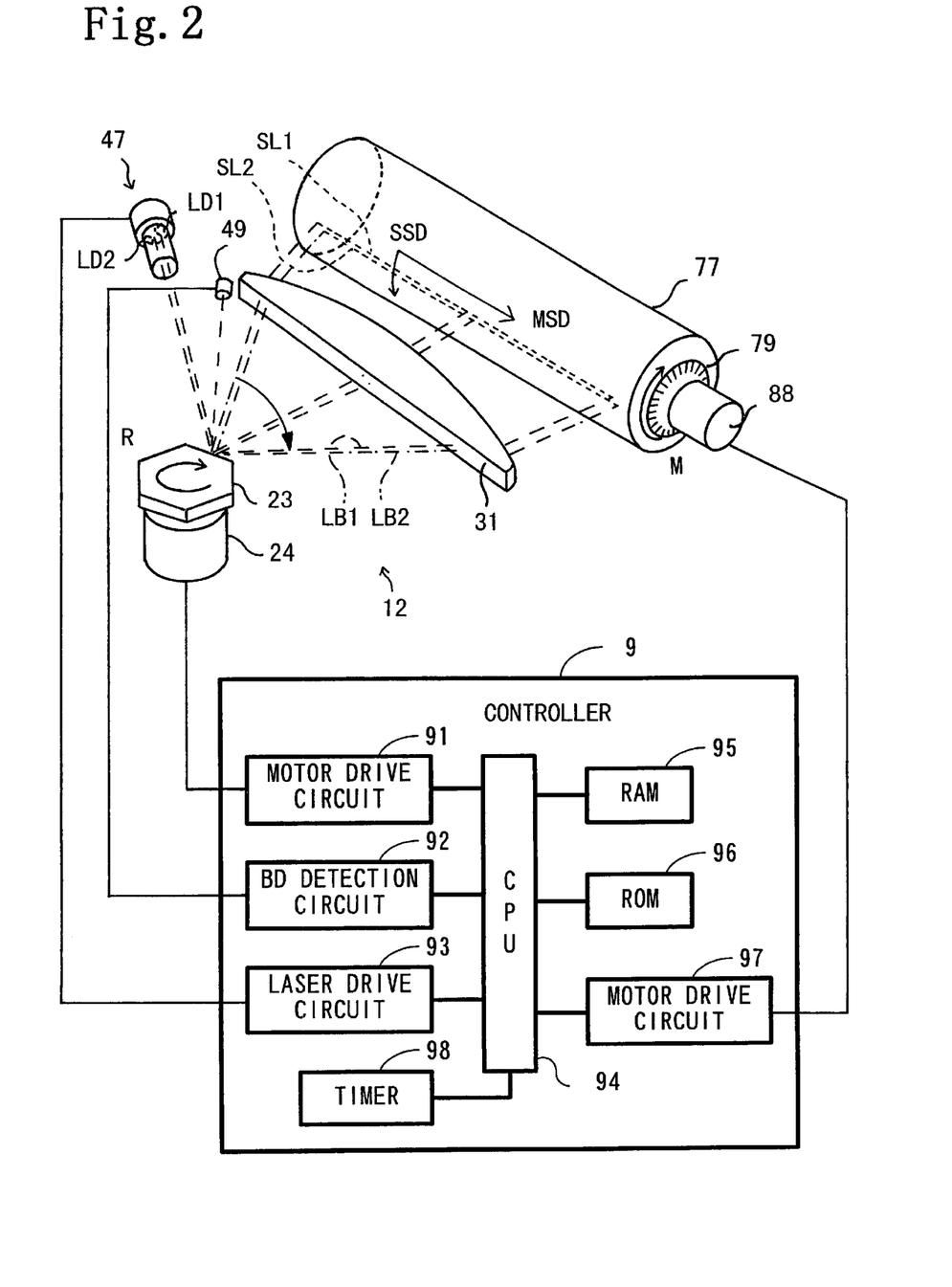
FIG. 2 shows a main structure of a multibeam scanner according to the exemplary embodiment of the invention.

Next, the main structure of the multibeam scanner 12 will be explained with reference to FIG. 2. FIG. 2 shows a main structure of the multibeam scanner 12.

The multibeam scanner 12 comprises a light emitting device 47, a polygon mirror 23, an fθ lens 31, a beam detector 49 and a controller 9. The controller 9 has a motor drive circuit 91, a BD signal detection circuit 92, a laser drive circuit 93, a CPU 94, a RAM 95 and a ROM 96, for controlling the multibeam scanner 12. The light emitting device 47 has two laser diodes LD1, LD2 therein. These laser diodes LD1 and LD2 emit laser beams LB1 and LB2, respectively, upon receipt of driving signals from the laser drive circuit 93. The laser beams LB1, LB2 pass through a collimating lens and a cylindrical lens (not shown in figures), and reach the polygon mirror 23. The polygon mirror 23 rotates in a direction indicated by an arrow R (shown in FIG. 2), driven by a motor 24 upon receipt of driving signals from the motor drive circuit 91. Thus, the polygon mirror 23 deflects the laser beams LB1, LB2 simultaneously to move at constant angular velocity. The deflected laser beams LB1 and LB2 pass through the fθ lens 31, and move at constant linear velocity in a main-scanning direction (indicated by an arrow MSD in FIG. 2) on the photosensitive drum 77, thereby forming scanning lines SL1 and SL2, respectively, on the photosensitive drum 77.

Before starting scanning the photosensitive drum 77, the laser diode LD1 is switched on to emit the laser beam LB1. The beam detector 49 detects the laser beam LB1 and outputs a BD signal to the BD signal detection circuit 92. Then, the laser diode LD1 is switched off. After a predetermined time period has elapsed since the BD signal detection circuit 92 detected the BD signal, the laser diode LD1 is switched on to emit the laser beam LB1 and to scan the photosensitive drum 77. The laser diode LD2 is switched on to emit the laser beam LB2 and to scan the photosensitive drum 77, after a time lag has passed since the laser diode LD1 was switched on.

The photosensitive drum 77 moves in a direction indicated by an arrow M (shown in FIG. 2), driven by a stepping motor 88 upon receipt of driving signals from another motor drive circuit 97, in synchronism with scan start times of laser beams LB1, LB2 along the main-scanning direction. A rotary encoder 79 is provided on the side of the photosensitive drum 77, and rotates in synchronism with the photosensitive drum 77. The rotary encoder 79 encodes the rotation of the photosensitive drum 77, and gives a feedback on the encoding to the controller 9, whereby the controller 9 controls the rotation of the stepping motor 88. Being moved in the direction M, the entire photosensitive drum 77 is successively scanned with the laser beams LB1, LB2 in a sub-scanning direction (indicated by an arrow SSD in FIG. 2) opposite to the direction M, thereby forming a series of scanning lines SL1, SL2. As a result, a latent image is formed with the scanning lines on the photosensitive drum 77.

The CPU 94 controls the multibeam scanner 12 according to various programs stored in the ROM 96. The RAM 95 temporarily stores the programs read out from the ROM 96 and process results from the CPU 94.

Figure 3:
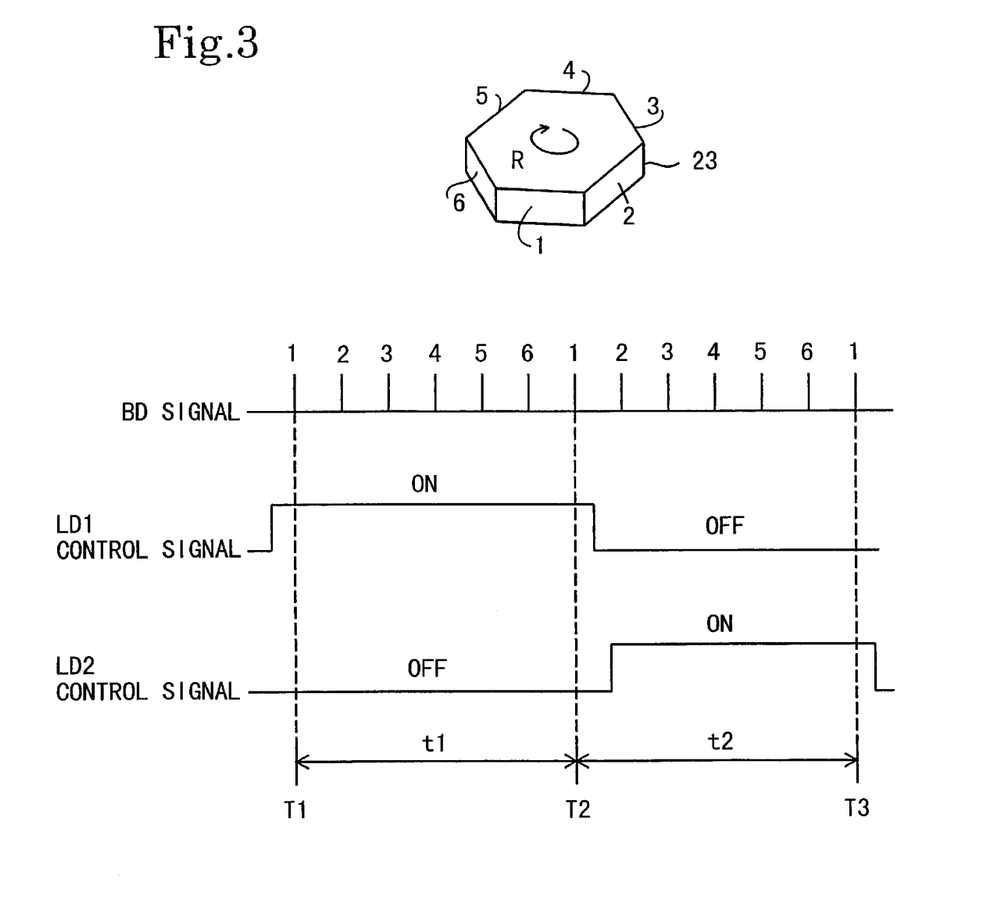
FIG. 3 is a time chart illustrating times of outputting BD signals, and control signals for switching on and off laser diodes LD1, LD2.
Figure 4:
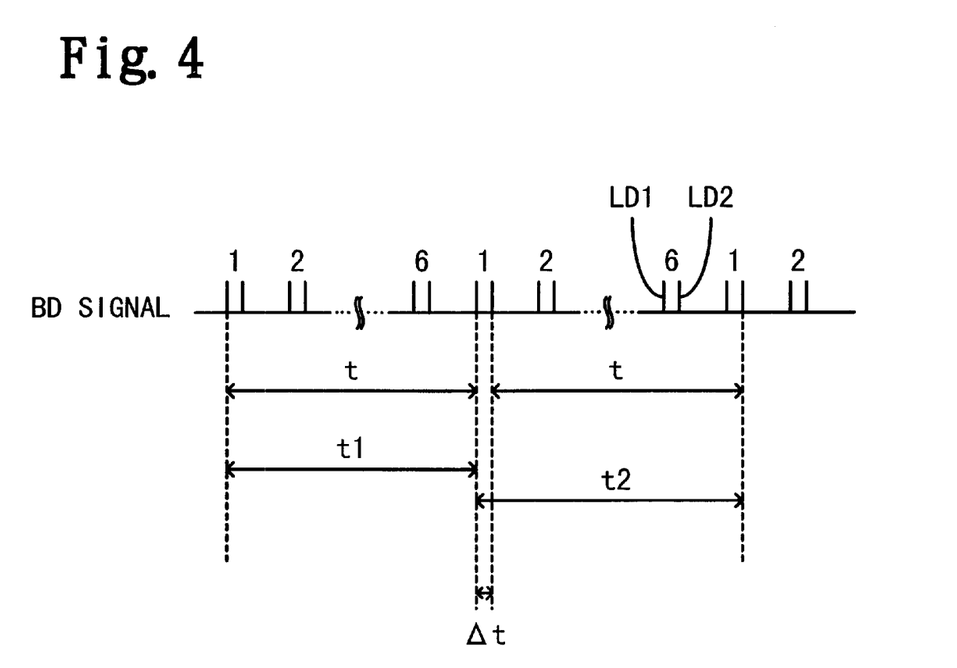
FIG. 4 schematically shows how a time lag Δt is determined between scan start times of laser beams LB1, LB2 emitted by the laser diodes LD1, LD2.

The explanation will hereinafter be given for determining a scan start time of the laser beam LB2 based on a scan start time of the laser beam LB1 with reference to FIGS. 3 and 4, according to a first exemplary embodiment. FIG. 3 is a time chart illustrating times for outputting BD signals and control signals for controlling the laser diodes LD1, LD2. In FIG. 3, when the control signals are "ON", the laser diodes LD1, LD2 are switched on to emit the laser beams LB1, LB2 to be deflected by the polygon mirror 23 toward the beam detector 49, and switched off to not emit the laser beams LB1, LB2 on the photosensitive drum 77. FIG. 4 shows how a time lag Δt is determined between the scan start times of the laser beams LB1 and LB2. In the exemplary embodiment, the polygon mirror 23 rotates in the direction R, and has six reflective surfaces 1 to 6.

When the LD1 control signal is put into the ON state, the laser beam LB1 is emitted by the laser diode LD1, and deflected by the reflective surface 1 of the polygon mirror 23 to the beam detector 49. The beam detector 49 outputs the BD signal, when detecting the laser beam LB1 deflected by the reflective surface 1.

The BD signal output for the laser beam LB1 or LB2 deflected by the reflective surface 1 is a BD1 signal. The time of outputting the BD1 signal is referred to as a time T1. As is the same, the BD signals output for the laser beam LB (LB1 or LB2) deflected by the surfaces 2 to 6 are BD2 to BD6 signals, respectively. In FIG. 3, numbers 1 to 6 indicated under a heading of the "BD signal" correspond to the BD1 to BD6 signals, respectively.

Successively, the laser beam LB1 is deflected by the reflective surfaces 2 to 6 of the polygon mirror 23 to the beam detector 49. The beam detector 49 detects the laser beam LB1 deflected by the reflective surfaces 2 to 6 and outputs the BD2 to BD6 signals, respectively.

When the polygon mirror 23 is turned one turn, the laser beam LB1 is again deflected by the reflective surface 1 to the beam detector 49, and then, the beam detector 49 outputs the BD1 signal. The time of outputting again the BD1 signal is referred to as a time T2. This time T2 is determined by, for example, counting a number of BD signals generated after the time T1 and detecting the count value of "7". The time period from the time T1 to the time T2 (namely, a rotation cycle t of the polygon mirror 23) is herein referred to as time period t1.

The LD1 control signal is put into the OFF state immediately after detecting the time T2. The LD2 control signal is put into the ON state to emit the laser beam LB2 on the reflective surface 1 of the polygon mirror toward the beam detector 49. The laser beam LB2 is then deflected by the reflective surfaces 2 to 6 successively to the beam detector 49. The beam detector 49 detects the laser beam LB2 deflected by the reflective surfaces 2 to 6 and outputs the BD2 to BD6 signals, respectively.

When the polygon mirror 23 is turned one more turn, the laser beam LB2 is again deflected by the reflective surface 1. The beam detector 49 detects the laser beam LB2 deflected by the reflective surface 1 and outputs the BD1 signal. This time of still again outputting the BD1 signal is referred to as a time T3. The time period between the times T2 and T3 is referred to as time period t2.

Then, both of the laser diodes LD1 and LD2 are activated to emit the laser beams LB1 and LB2 simultaneously with the beam detector 49 detecting the laser beams LB1 and LB2 continuously. The BD1 to BD6 signals are then generated in series, as shown in FIG. 4, each forming a pair of signals on the laser beams LB1, LD2.

Although the time period t1 also equals to the rotation cycle of the polygon mirror 23 in this case, the time period t2 is longer than the rotation cycle t of the polygon mirror 23 by a certain time difference Δt. It is because the time period t2 is defined as the time period between the times T2 and T3 (namely, the time period from the time of outputting the BD1 signal for the laser beam LB1 deflected by the reflective surface 1 to the time of outputting the BD1 signal against the laser beam LB2 deflected by the reflective surface 1), as described above. This time difference corresponds to the time lag Δt between the scan start times of the laser beams LB1 and LB2. That is, the time lag Δt is determined by subtracting the time period t1 from the time period t2.

Based on the above-explained concept underlying the invention, the time lag between the scan start time of the laser beams LB1 and LB2 can be easily determined for every multibeam scanner, without time- and labor-consuming work during manufacturing, in any environmental condition. This allows the multibeam scanner 12 to start scanning the photosensitive drum 77 from the same scan start position with both of the laser beams LB1, LB2, by determining the scan start time of the laser beam LB2 as after the time lag Δt from the scan start time of the laser beam LB1. That is, it is possible to correct any variations between the scan start positions of the laser beams LB1 and LB2.

There may be provided n number of laser diodes in the multibeam scanner 12, wherein n is an integer greater than 3. The time lag Δtn−1 between the scan start times of the laser diode LDn-1 and the laser diode LDn can be determined as the same as above. Herein, the beam detector 49 detects the laser beam LBn emitted by the laser diode LDn and reflected by the reflective surface 1, and outputs the BD1 signal at the time Tn+1. The time period between the time Tn and the time Tn+1 is referred to as the time period tn.

The time lag $\Delta tn-1$ can determined by subtracting the rotation cycle t of the polygon mirror 23 (namely, the time period t1) from the time period tn. The time lag $\Delta tn-1$ should substantially equal to the time lag $\Delta t$, as long as n number of laser diodes are spaced uniformly in the multibeam scanner 12. Thus, the time lag $\Delta tn-1$ may be set to the time lag $\Delta t$, without calculating the time lag $\Delta tn-1$ individually in the above-described manners. In this case, the laser diode LDn is switched on, when the time lag $\Delta tn$ has lapsed after the laser diode LDn-1 was switched on.

In other exemplary embodiments, the time lag $\Delta tn'$ between the scan start times of the laser beam LB1 and the laser beam LBn is determined by subtracting n-1 times rotation cycle t (namely, n-1 times time period t1) from a time period between the time T2 and the time Tn+1. In this case, the laser diode LDn is switched on, when the time lag $\Delta tn'$ has lapsed after the laser diode LD1 was switched on.

For example, the multibeam scanner 12 comprises the laser diodes LD1, LD2 and LD3 for emitting the laser beams LB1, LB2 and LB3. To determine the scan start time of the laser beam LB3, the beam detector 49 detects the laser beam LB3 and outputs the BD1 signal at the time T4. The time lag $\Delta t'$ between the scan start times of the laser beams LB1 and LB3 is determined by subtracting twice the time period t1 from the time period between the times T2 and T4. Thus, the laser diode LD3 is switched on, when the time lag $\Delta t'$ has lapsed after the laser diode LD1 was switched on. The determined time lag $\Delta t'$ would be substantially equal to twice the time lag between the scan start times of the laser beams LB1 and LB2.

Figure 5:
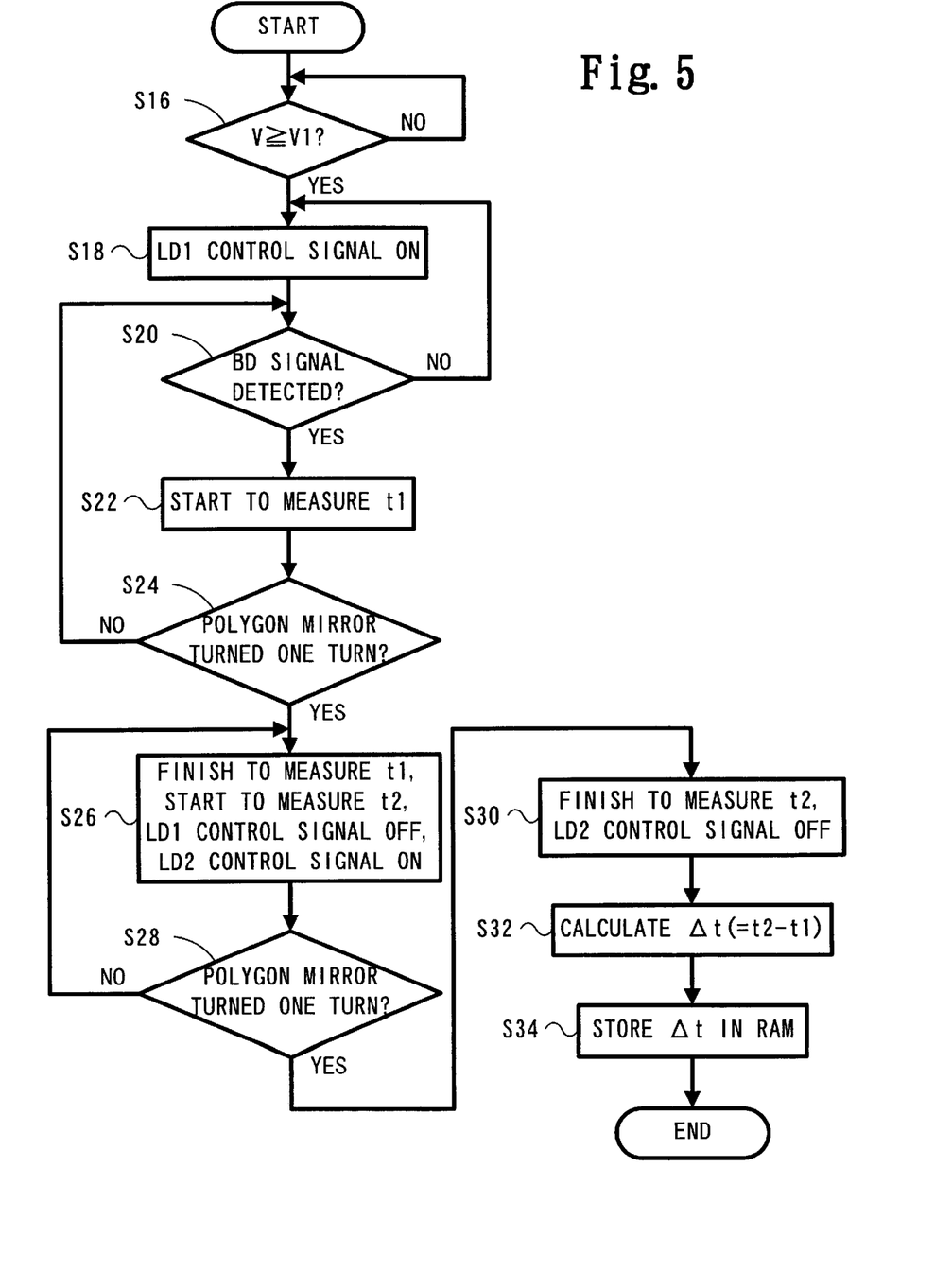
FIG. 5 is a flowchart for calculating and storing the time lag Δt for the multibeam scanner according to a first exemplary embodiment of the invention.

The control procedure for controlling the scan start time of the laser beam LB2 will be explained, while referring to FIG. 5, according to a first exemplary embodiment of the invention. FIG. 5 is a flowchart for calculating and storing the time lag $\Delta t$.

Firstly, the CPU 94 judges whether the rotation velocity V of the polygon mirror 23 reaches a predetermined velocity V1 and is stabilized at V1 in step S16. If Yes in step S16, the CPU 94 puts the LD1 control signal into the ON state in step S18. As described above, the LD1 control signal is for switching on the laser diode LD1 to emit the laser beam LB1 deflected by any reflective surface of the polygon mirror 23 toward the beam detector 49, and for switching off the laser diode LD1 to not emit the laser beams LB1 on the photosensitive drum 77. Upon putting the LD1 control signal into the ON state, the laser diode LD1 is switched on to emit the laser beam LB1.

When the laser beam LB1 is deflected by one reflective surface (referred to as a reference reflective surface) to the beam detector 49, the beam detector 49 detects the laser beam LB1 and outputs the BD signal. Then, the CPU 94 receives BD signal output by the beam detector 49 in step S20, and begins to measure the time period t1 by using a timer 98 in step S22.

In step S24, the CPU 94 judges whether the polygon mirror 23 has been turned one turn. When the polygon mirror 23 has rotated one turn, the laser beam LB1 emitted by the laser diode LD1 is deflected by the reference reflective surface to the beam detector 49. Then, the beam detector 49 detects the laser beam LB1 and outputs the BD signal.

If Yes in step S24, the CPU 94 receives the BD signal again. Thus, the CPU 94 finishes to measure and determines the time period t1, and stores the determined time period t1 in the RAM 95 in step S26. The LD1 control signal is put into the OFF state to switch off the laser diode LD1, at the same time, the LD2 control signal is put into the ON state to switch on the laser diode LD2. As is the same as above, the LD2 control signal is for switching on the laser diode LD2 to emit the laser beam LB2 deflected by any reflective surface toward the beam detector 49, and for switching off the laser diode LD2 to not emit the laser diode on the photosensitive drum 77. The CPU 94 begins to measure the time period t2 by the timer 98 in step S26.

Then, the CPU 94 judges, in step S28, whether the polygon mirror 23 has been turned one turn. When the polygon mirror 23 has rotated one turn, the laser beam LB2 emitted by the laser diode LD2 is deflected by the reference reflective surface to the beam detector 49. Then, the beam detector 49 detects the laser beam LB2 and outputs the BD signal.

If Yes in step S28, the CPU 94 receives the BD signal. Thus, the CPU 94 finishes to measure and determines the time period t2, and stores the determined time period t2 in the RAM 95 in step S30. The LD2 control signal is put into the OFF state.

In step S32, the CPU 94 reads the time periods t1 and t2 out of the RAM 95, and determines the time lag $\Delta t$ by subtracting t1 from t2. The CPU 94 stores the determined time lag $\Delta t$ in the RAM 95 in step S34.

Afterwards, scanning operations are repeatedly performed based on image data, whereby the laser beams LB1, LB2 form the scanning lines SL1, SL2. In the scanning operations, the CPU 94 controls the photosensitive drum 77 to start scanning with the laser beam LB1 after the predetermined time period has passed since the beam detector 49 detected the laser beam LB1. Then, the CPU 94 controls the photosensitive drum 77 to start scanning with the laser beam LB2 after the time lag $\Delta t$ has elapsed since CPU 94 started scanning the photosensitive medium 77 with the laser beam LB1.

According to the first exemplary embodiment, as described above, the multibeam scanner 12 detects the time periods t1 and t2 by switching on the laser diodes LD1 and LD2 alternately, and determines the time lag $\Delta t$ by subtracting t1 from t2. Thus, it is possible to determine the time lag $\Delta t$ between the scan start times of the laser beams LB1 and LB2 with high precision and to define the scan start time of the laser beam LB2 relative to the scan start time of the laser beam LB1. Namely, the multibeam scanner 12 of the invention is capable of correcting any variations between the scan start times of the laser beams LB1, LB2, and starting scanning the photosensitive drum 77 from the same scan start position with the laser beams LB1, LB2. Therefore, the multibeam scanner 12 can provide images without a loss of image quality, as described above.

Next, the control procedure for controlling the scan start time of the laser beam LB2 will be explained, while referring to FIG. 6, according to a second exemplary embodiment of the invention. According to the second exemplary embodiment, the multibeam scanner 12 determines the time lag $\Delta t$ every time the laser printer 1 is turned on. Herein, like parts and components are designated by the same reference numerals to avoid duplicating the description.

Figure 6:
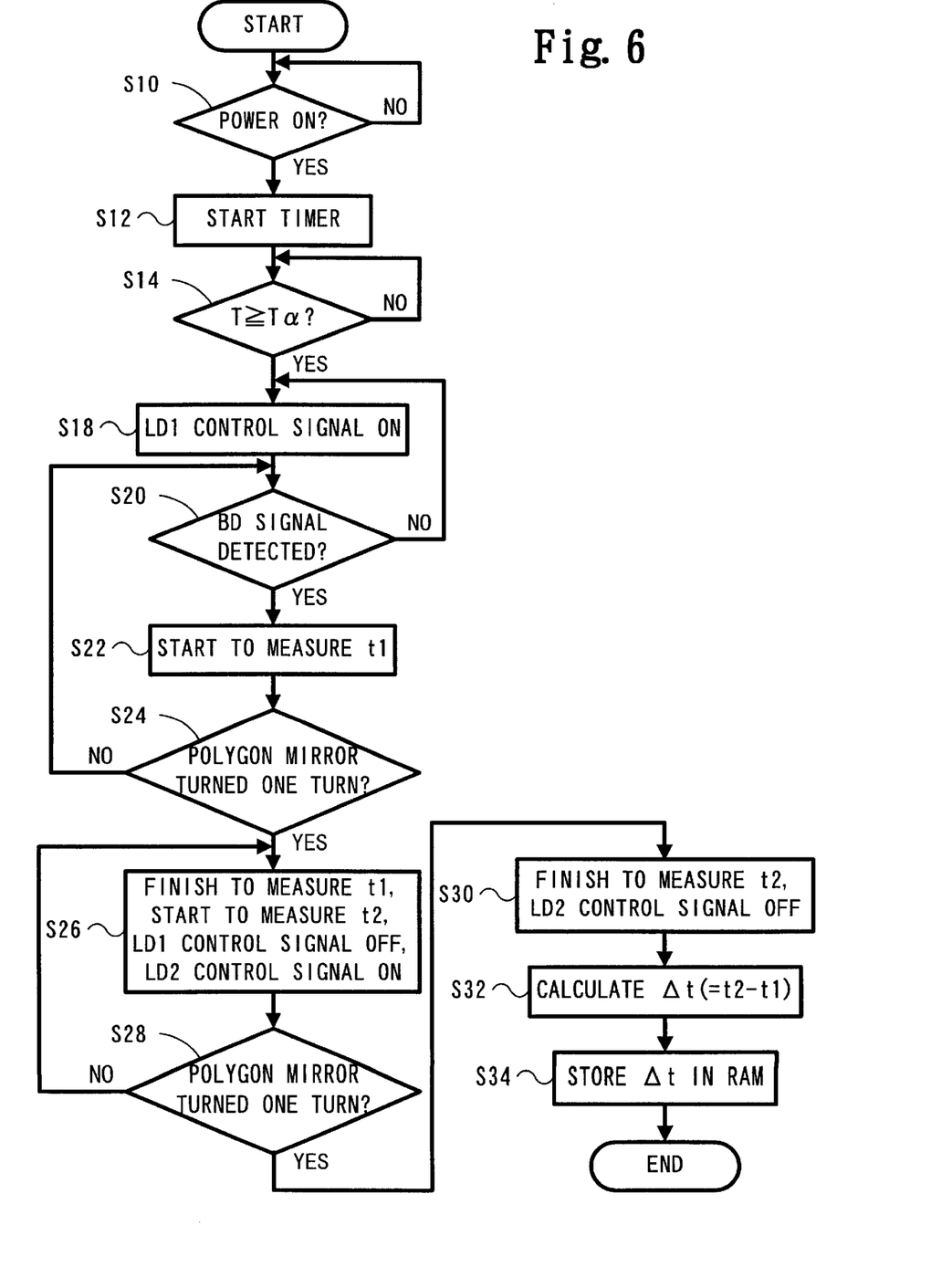
FIG. 6 is a flowchart for calculating and storing the time lag Δt for the multibeam scanner according to a second exemplary embodiment of the invention.

FIG. 6 is a flowchart for calculating and storing the time lag $\Delta t$ according to the second exemplary embodiment. The description will only be made of the differences between the first and the second exemplary embodiments, as most operation steps of FIG. 6 are the same as those of FIG. 5

In step S10, the CPU 94 detects that a power source of the laser printer 1 is turned on. If Yes in step S10, the CPU 94 starts to count time T by using the timer 98 in step S12. Then, the CPU 94 judges whether the count value T of the timer reaches a predetermined time Tα in step S14. If Yes in step S14, the CPU 94 executes steps S18 to S34. These steps S18 to S34 are the same as the above-explained steps S18 to S34 of the first exemplary embodiment.

According to the second exemplary embodiment, it is possible for the multibeam scanner 12 of the invention to determine the time lag Δt between the scan start times of the laser beams LB1 and LB2 with high precision, every time the laser printer 100 is switched on. This allows correcting variations between the scan start positions of the laser beams LB1 and LB2, appropriate to the temperature condition of its surroundings, and at the same time, avoiding such variations lingering for the next power-up.

The control procedure for controlling the scan start time of the laser beam LB2 will be explained, while referring to FIG. 7, according to a third exemplary embodiment of the invention. According to the third exemplary embodiment, the multibeam scanner 12 detects the time lag Δt repeatedly, calculates an average value Δta between the repeatedly detected time lags, and uses the average value Δta for controlling the scan start time of the laser beam LB2. Like reference numerals are used throughout to designate like parts and elements.

Figure 7:
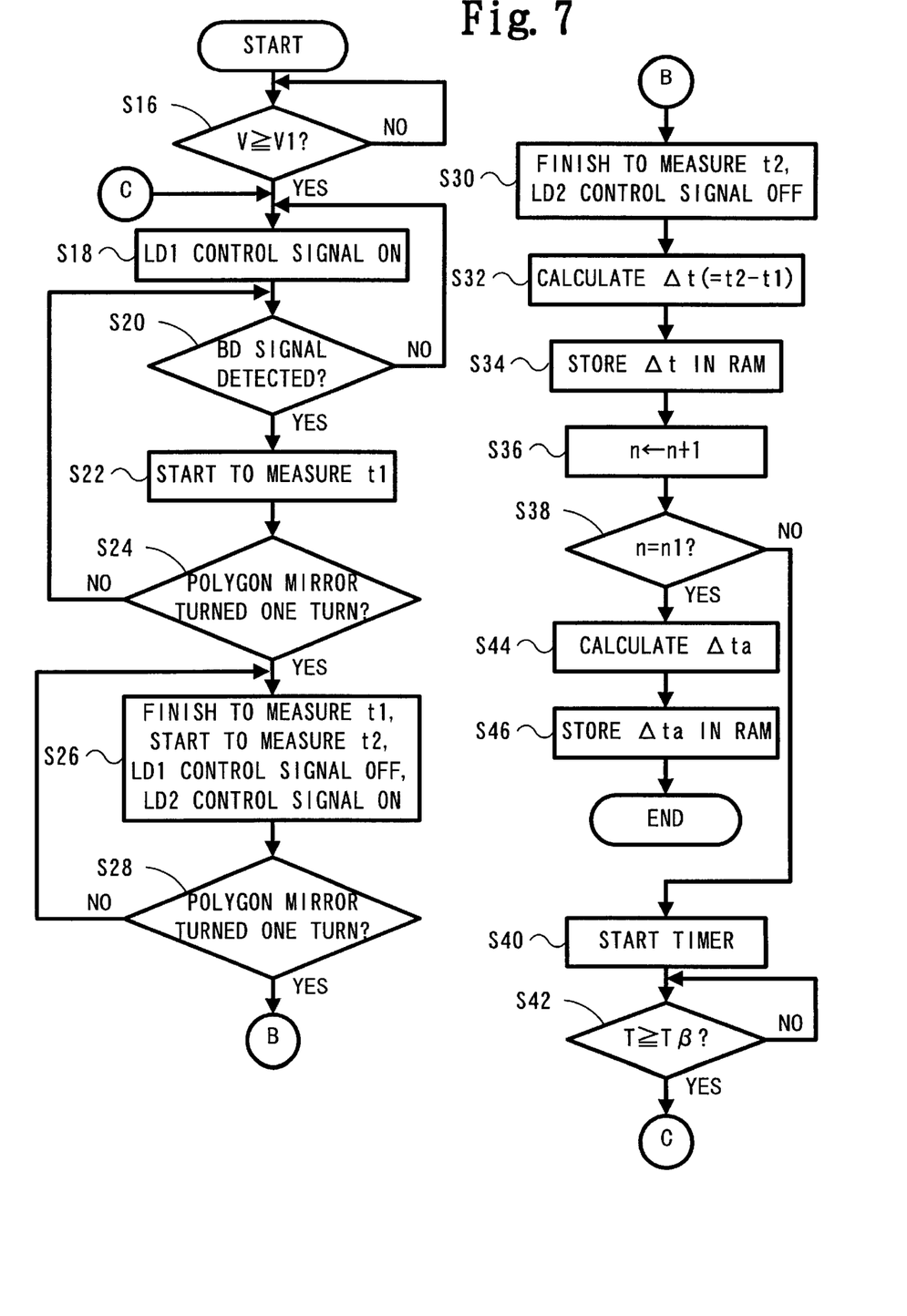
FIG. 7 is a flowchart for calculating and storing the time lag Δt for the multibeam scanner according to a third exemplary embodiment of the invention.

FIG. 7 is a flowchart for calculating and storing the average value Δta between the time lags Δt according to the third exemplary embodiment. The description will be made only of main points of a difference between the first and the third exemplary embodiments, as most operation steps of FIG. 7 are the same to those of FIG. 5.

The CPU 94 firstly performs steps S16 to S34, thereby determining the time lag Δt and storing the determined time lag Δt in the RAM 95. These steps S16 to S34 are the same as the above-explained steps S16 to S34 of the first exemplary embodiment. Then, in step S36, the CPU 94 increments a calculation number n, indicating a number for determining the time lag Δt, by 1. In step S38, the CPU 94 judges whether the calculation number n reaches a predetermined calculation number n1. This calculation number n1 may be a fixed value that has previously been set, or an input value input by a user. If No in step S38, the CPU 94 starts to counts time T by using the timer 98 in step S40. Then, the CPU 94 judges whether the count value T of the timer reaches a predetermined time Tβ in step S42. If Yes in step S42, the CPU 94 executes again steps S16 to S34. If Yes in step S38, the CPU 94 calculates the average value Δta among n number of the determined time lag Δt in step S44. In step S46, the CPU 94 stores the average value Δta in the RAM 95.

According to the third exemplary embodiment, it is possible for the multibeam scanner 12 of the invention to determine the time lag Δt between the scan start times of the laser beams LB1 and LB2 with high precision, by using the average value Δta of a plurality of time lags. This allows correcting variations between the scan start positions of the laser beams LB1 and LB2 with high precision The control procedure for controlling the scan start time of the laser beam LB2 will be explained, while referring to FIG. 8, according to a fourth exemplary embodiment of the invention. According to the fourth exemplary embodiment, the multibeam scanner 12 gives an alarm, when a difference between the determined time lag Δt and a standard time lag Δtb is more than or equal to a predetermined dot scan time period td. Herein, like parts and components are designated by the same reference numerals to avoid duplicating the description.

Figure 8:
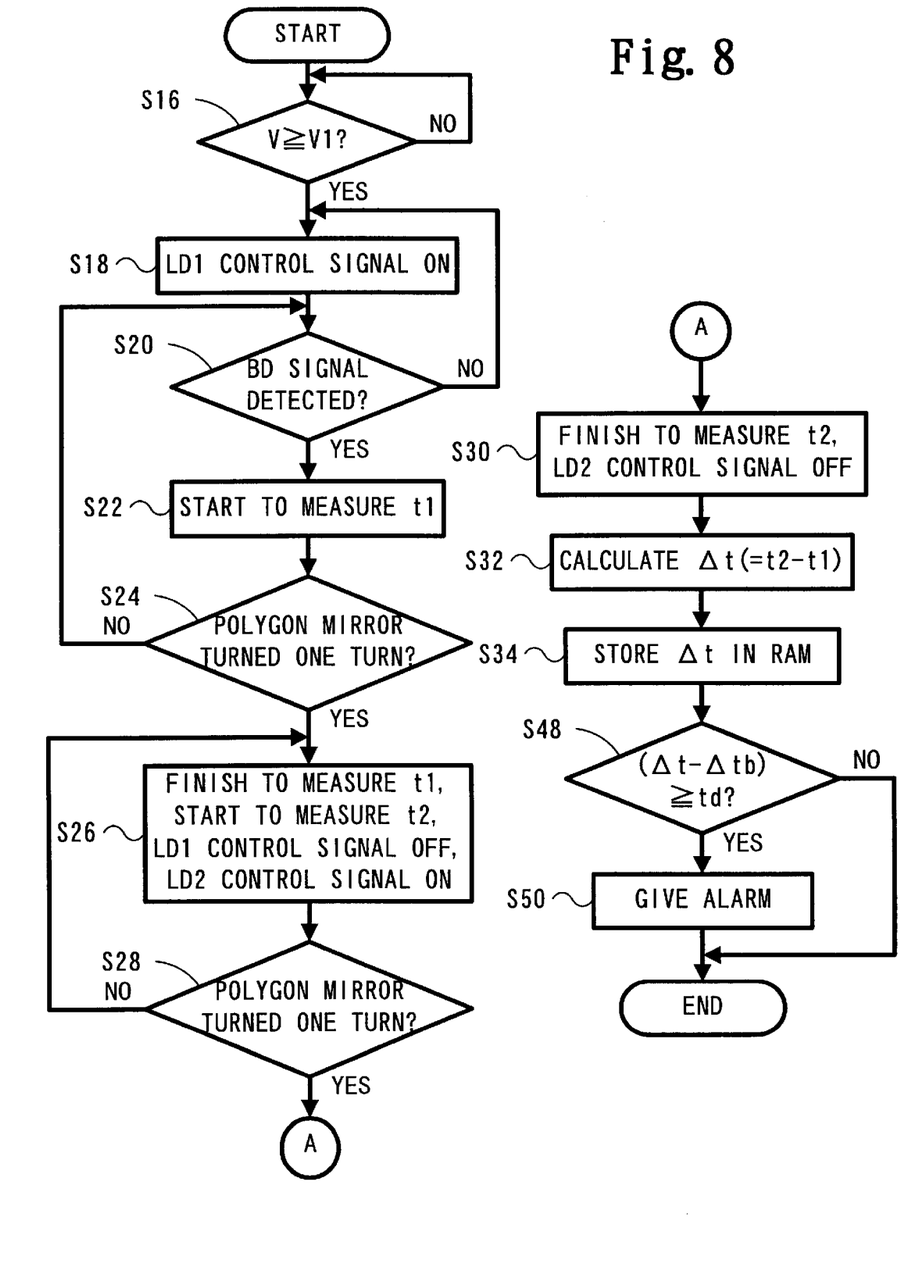
FIG. 8 is a flowchart for calculating and storing the time lag Δt for the multibeam scanner according to a fourth exemplary embodiment of the invention.

FIG. 8 is a flowchart for calculating and storing the time lags Δt and giving an alarm according to the fourth exemplary embodiment. The description will be made of the differences between the first and the fourth exemplary embodiments, as most operation steps of FIG. 8 are the same to those of FIG. 5.

The CPU 94 performs steps S16 and S34, thereby determining the time lag Δt and storing the determined time lag Δt in the RAM 95. These steps S16 to S34 are the same to the above-explained steps S16 to S34 of the first exemplary embodiment. Then, in step S48, the CPU 94 calculates a difference between the time lag Δt and the standard time lag Δtb, and compares the difference (Δt−Δtb) with the dot scan time period td. In other words, the CPU 49 judges whether a variation in the time lag Δt is larger than the dot scan time period td. The standard time lag Δtb and the dot scan time period td have been previously stored in the ROM 96. The dot scan time period is defined as, for example, a half of a dot clock. One dot clock corresponds to a dot pitch between two dots. If Yes in step S48, the CPU 49 gives an alarm in step S50, by lighting up an alarm LED (not shown in figures) provided on the laser printer 1, or indicating an error message on an operation panel (not shown in figures).

According to the fourth exemplary embodiment, as described above, the multibeam scanner 12 of the invention gives an alarm, when the difference (Δt−Δtb) between the determined time lag Δt and the standard time lag Δtb is more than or equal to the predetermined dot scan time period td. This allows users to confirm the operation status of the multibeam scanner 12 in case a malfunction occurs.

Further, the multibeam scanner 12 according to any of the above-mentioned exemplary embodiments could determine the time lag Δt between the scan start times of the laser beams LB1 and LB2, while rotating the polygon mirror 23 two or more turns during the time periods t1 and t2. In such a case, the time lag Δt is determined by dividing a time difference (t2−t1) by a number of rotations for the polygon mirror 23.

Still further, the time lag Δt may be regularly determined at established time intervals after the rotation velocity V of the polygon mirror 23 is stabilized at the predetermined velocity V1, or the power source is turned on. The time intervals could be managed on a year, a monthly, a dairy, an hour, a minute, a second or their combination basis. Also, the time intervals could be managed only while switching on the laser printer 100, or regardless of switching on and off the laser printer 100, or while performing printing operations.

Yet further, the time lag Δt may be determined prior to every printing operation, or after performing a plurality of printing operations.

The laser printer 100 according any of the above-described exemplary embodiments may have a temperature sensor at a predetermined location therein. In this case, the multibeam scanner 12 determines the time lag Δt between the scan start times of the laser beams LB1 and LB2, when the temperature sensor detects a higher temperature than a fixed temperature value.

Although the invention has been described in detail through the specific exemplary embodiments, it would be apparent to those skilled in the art that various changes and modifications may be made therein without departing from the spirit of the invention.

The multibeam scanner of the invention is not limited for use in the laser printer. The multibeam scanner of the invention will be widely used for, for instance, an image projector.

What is claimed is:

1. A multibeam scanner for scanning an image area with a plurality of laser beams and forming a plurality of scanning lines corresponding to the plurality of laser beams along a predetermined scan direction in the image area, the multibeam scanner comprising:

a plurality of beam emitting points arranged at respective positions, and the plurality of beam emitting points emitting a plurality of laser beams reaching the image area with respective time lags corresponding to the respective positions;

a time lag determination unit that determines at least one of the time lags by generating a first time period between a reference detection time and a first detection time and a second time period between the first detection time and a second detection time and thereafter subtracting the first time period from the second time period, wherein the reference detection time is a time when a laser beam emitted by one of the plurality of the beam emitting points is detected at a predetermined beam detection position during a first scanning cycle and the first detection time is a time when the laser beam emitted by the one of the plurality of the beam emitting is detected at the predetermined beam detection position during a second scanning cycle and the second detection time is a time when the laser beam emitted by another one of the plurality of the beam emitting points is detected at the predetermined beam detection position during a third scanning cycle; and a scan controller that controls the plurality of beam emitting points successively to start emitting the laser beams in the image area at respective scan start times, the scan start times having the determined at least one of the time lags therebetween.

2. The multibeam scanner as claimed in claim 1, further comprising:

a photodetector that detects any one of the laser beams emitted by the plurality of beam emitting points at a predetermined beam detection position, and wherein the scan controller inhibits the plurality of beam emitting points to emit the laser beams between the photodetector and the image area.

3. The multibeam scanner as claimed in claim 2, wherein the plurality of beam emitting points include at least a first beam emitting point that emits a first laser beam reaching the image area first, and a second beam emitting point that emits a second laser beam reaching the image area second, wherein the photodetector detects the first laser beam at the predetermined beam detection position, prior to the image area, and wherein the scan controller determines a scan start time for the first laser beam upon detection of the first laser beam, controls the first beam emitting point to start emitting the first laser beam in the image area at the determined scan start time of the first laser beam, and controls the second beam emitting point to start emitting the second laser beam in the image area at a scan start time of the second laser beam with the time lag determined by the time lag determination unit between the scan start times of the first and the second laser beams.

4. The multibeam scanner as claimed in claim 3, further comprising:

a deflector that comprises a plurality of deflection surfaces and rotates in a predetermined direction for deflecting the laser beams by the deflection surfaces to make the laser beams reach the photodetector and the image area.

5. The multibeam scanner as claimed in claim 4, wherein the time lag determination unit comprises a beam emission controller that controls, during a predetermined determination time, the first beam emitting point to emit the first laser beam deflected by a one deflection surface to the photodetector and deflected by the one deflection surface to the photodetector upon a single turn of the deflector after the first laser beam is deflected previously by the one deflection surface, and the second beam emitting point to emit the second laser beam deflected by the one deflection surface to the photodetector upon a single turn of the deflector after the first laser beam lately deflected by the one deflection surface, wherein the photodetector sets the reference detection time upon detection of the first laser beam previously deflected by the one deflection surface, the first detection time upon detection of the first laser beam lately deflected by the one deflection surface, and the second detection time upon detection of the second laser beam deflected by the one deflection surface, wherein the time lag determination unit further comprises a time lag generation unit that generates the first time period between the reference detection time and the first detection time and the second time period between the first detection time and the second detection time, and generates a first time lag by subtracting the first time period from the second time period, and wherein the scan controller controls the second beam emitting points to start emitting the second laser beam in the image area with the generated first time lag between the scan start times of the first and the second laser beams.

6. The multibeam scanner as claimed in claim 5, wherein the plurality of beam emitting points include a nth beam emitting point for emitting a nth laser beam that reaches the image area in the nth place, n representing an integer greater than two, and wherein the scan controller controls the nth beam emitting point to start emitting the nth laser beam at a scan start time of the nth laser beam.

7. The multibeam scanner as claimed in claim 6, wherein the scan controller determines the scan start time of the nth laser beam with the first time lag between the scan start times of the n−1th and the nth laser beams, and controls the nth beam emitting point to start emitting the nth laser beam at the determined scan start time of the nth laser beam.

8. The multibeam scanner as claimed in claim 6, wherein the beam emission controller that controls the nth beam emitting point to emit the nth laser beam deflected by the one deflection surface to the photodetector upon a single turn of the deflector after the n−1th laser beam is deflected by the one deflection surface, and wherein the photodetector detects the nth laser beam, and sets a nth detection time upon detection of the nth laser beam.

9. The multibeam scanner as claimed in claim 8, wherein the time lag generation unit generates a n−1th-to-nth time period between the n−1th and the nth detection times, and generates a n−1th-to-nth time lag by subtracting the first time period from the n−1th-to-nth time period, and wherein the scan controller controls the nth beam emitting point to start emitting the nth laser beam with the generated n−1th-to-nth time lag between the scan start times of the n−1th and the nth laser beams.

10. The multibeam scanner as claimed in claim 8, wherein the time lag generation unit determines a first-to-nth time period between the first and the nth detection times, and generates a first-to-nth time lag by subtracting n−1 times the first time period from the first-to-nth time period, and wherein the scan controller controls the nth beam emitting point to start emitting the nth laser beam with the generated first-to-nth time lag between the scan start times of the first and the nth laser beams.

11. The multibeam scanner as claimed in claim 4, wherein the time lag determination unit comprises a beam emission controller that controls, during a predetermined determination time, the first beam emitting point to emit the first laser beam deflected by a one deflection surface to the photodetector and deflected by the one deflection surface to the photodetector upon a predetermined number of turns of the deflector after the first laser beam being deflected previously by the one surface, and the second beam emitting point to emit the second laser beam deflected by the one deflection surface to the photodetector upon the predetermined number of turns of the deflector after the first laser beam is lately deflected by the one deflection surface, wherein the photodetector sets the reference detection time upon detection of the first laser beam previously deflected by the one deflection surface, the first detection time upon detection of the first laser beam is lately deflected by the one deflection surface, and the second detection time upon detection of the second laser beam deflected by the one deflection surface, wherein the time lag determination unit further comprises a time lag generation unit that generates the first time period between the reference detection time and the first detection time and the second time period between the first detection time and the second detection time, and generates a first time lag by subtracting the first time period from the second time period and dividing by the predetermined number of turns, and wherein the scan controller controls the second beam emitting points to start emitting the second laser beam in the image area with the generated first time lag between the scan start times of the first and the second laser beams.

12. The multibeam scanner as claimed in claim 11, wherein the plurality of beam emitting points include a nth beam emitting point for emitting a nth laser beam that reaches the image area in the nth place, n representing an integer of greater than two, and wherein the scan controller controls the nth beam emitting point to start emitting the nth laser beam at a scan start time of the nth laser beam.

13. The multibeam scanner as claimed in claim 12, wherein the scan controller determines the scan start time of the nth laser beam with the first time lag between the scan start times of the n−1th and the nth laser beams, and controls the nth beam emitting point to start emitting the nth laser beam at the determined scan start time of the nth laser beam.

14. The multibeam scanner as claimed in claim 12, wherein the beam emission controller that controls the nth beam emitting point to emit the nth laser beam deflected by the one deflection surface to the photodetector upon the predetermined number of turns of the deflector after the n−1th laser beam being deflected by the one deflection surface, and wherein the photodetector detects the nth laser beam, and sets a nth detection time upon detection of the nth laser beam.

15. The multibeam scanner as claimed in claim 14, wherein the time lag generation unit generates a n−1th-to-nth time period between the n−1th and the nth detection times, and generates a n−1th-to-nth time lag by subtracting the first time period from the n−1th-to-nth time period and dividing by the predetermined number of turns, and wherein the scan controller controls the nth beam emitting point to start emitting the nth laser beam with the generated n−1th-to-nth time lag between the scan start times of the n−1th and the nth laser beams.

16. The multibeam scanner as claimed in claim 14, wherein the time lag generation unit determines a first-to-nth time period between the first and the nth detection times, and generates a first-to-nth time lag by subtracting n−1 times the first time period from the first-to-nth time period and dividing by the predetermined number of turns, and wherein the scan controller controls the nth beam emitting point to start emitting the nth laser beam with the generated first-to-nth time lag between the scan start times of the first and the nth laser beams.

17. The multibeam scanner as claimed in claim 4, wherein the time lag determination unit comprises a rotation speed detection unit for detecting a rotation speed of the deflector, and wherein the time lag determination unit determines the at least one of time lags when the rotation speed detection unit detects that the rotation speed is stabilized at a predetermined rotation speed.

18. The multibeam scanner as claimed in claim 1, further comprising:

a power source that supplies the multibeam scanner with power by switching on; and wherein the time lag determination unit determines the at least one of the time lags every time the power source is switched on.

19. The multibeam scanner as claimed in claim 1, wherein the time lag determination unit determines the at least one of the time lags repeatedly, and generates at least one average time lag from the repeatedly determined time lags, and wherein the scan controller controls the plurality of the beam emitting points to start emitting the laser beams with the generated at least one average time lag therebetween.

20. The multibeam scanner as claimed in claim 1, further comprising:

a memory that stores a standard time lag; and an alarm generating unit that generates an alarm when a difference between the standard time lag and the determined time lag is larger than a threshold value.

21. The multibeam scanner as claimed in claim 20, wherein the plurality of laser beams generate dots at predetermined intervals along the scanning lines in the image area, and wherein the threshold value corresponds to one-half of a time between generating adjacent two dots along the predetermined scan direction.

22. The multibeam scanner as claimed in claim 1, wherein the time lag determination unit determines the at least one of the time lags at predetermined time intervals.

23. A multibeam scanner for scanning an image area with a plurality of laser beams and forming a plurality of scanning lines in the image area along a predetermined scan direction, the multibeam scanner comprising:

a beam emitting means for emitting a plurality of laser beams that reach the image area with respective time lags therebetween;

a time lag determination means for determining at least one of the time lags by generating a first time period between a reference detection time and a first detection time and a second time period between the first detection time and a second detection time and thereafter subtracting the first time period from the second time period, wherein the reference detection time is a time when a laser beam emitted by one of the plurality of the beam emitting points is detected at a predetermined beam detection position during a first scanning cycle and the first detection time is a time when the laser beam emitted by the one of the plurality of the beam emitting is detected at the predetermined beam detection position during a second scanning cycle and the second detection time is a time when the laser beam emitted by another one of the plurality of the beam emitting points is detected at the predetermined beam detection position during a third scanning cycle; and a scan control means for controlling the beam emitting means to start emitting the plurality of laser beams in the image area with the determined time lags therebetween.

24. A method for scanning an image area with a plurality of laser beams and forming a plurality of scanning lines in the image area along a predetermined scan direction, comprising the steps of:

emitting a plurality of laser beams that reach the image area with respective time lags therebetween;

determining at least one of the time lags by generating a first time period between a reference detection time and a first detection time and a second time period between the first detection time and a second detection time and thereafter subtracting the first time period from the second time period, wherein the reference detection time is a time when a laser beam emitted by one of the plurality of the beam emitting points is detected at a predetermined beam detection position during a first scanning cycle and the first detection time is a time when the laser beam emitted by the one of the plurality of the beam emitting is detected at the predetermined beam detection position during a second scanning cycle and the second detection time is a time when the laser beam emitted by another one of the plurality of the beam emitting points is detected at the predetermined beam detection position during a third scanning cycle; and controlling the plurality of laser beams to start emitting in the image area with the determined time lags therebetween.

* * * * *